United States Patent [19]
Currie

[11] Patent Number: 6,117,020
[45] Date of Patent: Sep. 12, 2000

[54] LASER AIM DETERMINATION SYSTEM FOR USE IN CREATING A CUSTOM MADE PUTTER

[75] Inventor: Kirk Currie, Spring, Tex.

[73] Assignee: Kurr Golf Technology, Inc., Conroe, Tex.

[21] Appl. No.: 09/238,841

[22] Filed: Jan. 28, 1999

Related U.S. Application Data

[63] Continuation-in-part of application No. 08/789,164, Jan. 24, 1997, Pat. No. 5,974,645.

[51] Int. Cl.[7] .................................................. A63B 69/36
[52] U.S. Cl. ............................................................... 473/220
[58] Field of Search ..................... 473/220, 219, 473/226, 231, 278, 279

[56] References Cited

U.S. PATENT DOCUMENTS

| | | | |
|---|---|---|---|
| 4,251,077 | 2/1981 | Pelz et al. | 273/186 A |
| 4,341,384 | 7/1982 | Thackrey | 273/186 R |
| 4,367,877 | 1/1983 | Gibson et al. | 273/77 R |
| 4,693,478 | 9/1987 | Long | 273/164 |
| 4,913,441 | 4/1990 | Freer | 273/186 A |
| 4,997,189 | 3/1991 | Perkins | 273/181 |
| 5,029,868 | 7/1991 | Cloud | 273/186 |
| 5,092,602 | 3/1992 | Witler et al. | 273/184 R |
| 5,165,691 | 11/1992 | Cook | 273/186.3 |
| 5,167,415 | 12/1992 | Iandola | 273/186.2 |
| 5,169,150 | 12/1992 | Tindale | 473/220 |
| 5,193,812 | 3/1993 | Hendricksen | 273/186.3 |
| 5,207,429 | 5/1993 | Walmsley et al. | 273/186.2 |
| 5,213,331 | 5/1993 | Avanzini | 273/186.3 |
| 5,217,228 | 6/1993 | De Aguilar | 273/186.3 |
| 5,245,537 | 9/1993 | Barber | 364/410 |
| 5,290,037 | 3/1994 | Witler et al. | 273/189 R |
| 5,330,188 | 7/1994 | Reimers | 273/186.1 |
| 5,374,063 | 12/1994 | Ogden | 273/186.3 |
| 5,375,832 | 12/1994 | Witler et al. | 273/184 R |
| 5,388,832 | 2/1995 | Hsu | 273/186.3 |
| 5,435,562 | 7/1995 | Stock et al. | 273/186.3 |
| 5,452,897 | 9/1995 | Mick | 273/186.2 |
| 5,464,221 | 11/1995 | Carney | 273/186.3 |
| 5,464,222 | 11/1995 | Carney | 273/186.3 |
| 5,465,972 | 11/1995 | Cornett | 273/186.3 |
| 5,467,991 | 11/1995 | White, IV et al. | 273/186.3 |
| 5,467,992 | 11/1995 | Harkness | 273/187.2 |
| 5,472,204 | 12/1995 | English et al. | 273/186.3 |
| 5,482,283 | 1/1996 | Wall | 273/186.3 |
| 5,486,001 | 1/1996 | Baker | 273/183.1 |
| 5,486,002 | 1/1996 | Witler et al. | 273/184 R |
| 5,527,041 | 6/1996 | Terry, III et al. | 473/150 |
| 5,560,607 | 10/1996 | Macroglou | 273/210 |
| 5,593,354 | 1/1997 | Falossi et al. | 473/220 |
| 5,611,739 | 3/1997 | Carney | 473/220 |
| 5,626,526 | 5/1997 | Pao et al. | 473/156 |
| 5,632,689 | 5/1997 | Duca | 473/279 |
| 5,692,965 | 12/1997 | Nighan, Jr. et al. | 473/220 |
| 5,707,296 | 1/1998 | Hodgson et al. | 473/220 |
| 5,707,297 | 1/1998 | Shu | 473/220 |
| 5,709,609 | 1/1998 | Carney | 473/220 |
| 5,725,439 | 3/1998 | Halsey et al. | 473/220 |
| 5,725,440 | 3/1998 | Finney | 473/220 |
| 5,738,595 | 4/1998 | Carney | 473/209 |
| 5,759,110 | 6/1998 | Seibel et al. | 473/220 |
| 5,776,007 | 7/1998 | Kendall et al. | 473/258 |
| 5,818,036 | 10/1998 | Daly | 250/216 |

*Primary Examiner*—Benjamin H. Layno
*Attorney, Agent, or Firm*—Jenkens & Gilchrist, A Professional Corporation

[57] ABSTRACT

A method for determining the directional aiming tendencies of an individual golfer using a laser sighting device which includes a body portion having a flat end surface on one end and a pointer on its opposite end. Underneath the body portion is a laser light assembly. The golfer positions his/her putter to direct a golf ball toward a hole. Once the ball strike face of the putter is aligned to the golfer's satisfaction, the golf ball is replaced with the laser sighting device. The flat surface of the device is placed flush against the ball-striking face of the putter. The device is turned on, projecting a laser light from the pointer to the golf hole. The laser light provides an indication of whether a golfer is aiming to the left or to the right of a target line between the position of the golf ball and a hole or simulated hole.

2 Claims, 4 Drawing Sheets

LASER AIM DETERMINATION SYSTEM FOR USE IN CREATING A CUSTOM MADE PUTTER

This application is a continuation-in-part of U.S. patent application Ser. No. 08/789,164, Filed Jan. 24, 1997 now U.S. Pat. No. 5,974,645.

FIELD OF THE INVENTION

The present invention pertains to golf putters; more particularly the present invention pertains to an aiming device for assisting in the custom manufacturing of a putter to suit the physiology of an individual golfer.

BACKGROUND OF THE INVENTION

There are three basic factors which impact the way a golfer puts a golf ball. These three basic factors are: (i) the physiology of the golfer's body, (ii) the psychology of the golfer's approach to putting, and (iii) the putter itself. Each of these three factors is interrelated to the other two factors.

Included in the physiology of the golfer's body are the golfer's skeletal and muscular structure, the golfer's eye-hand coordination, and the golfer's hearing.

Included in the psychology of the golfer's approach to putting is the golfer's conscious and subconscious approach to moving a putter in such a way that the golfer's putting stroke imparts motion to a stationary golf ball across a green in a direction toward the hole on a golf course.

Finally, the dimensions and geometric relationships included in the specifications describing a putter make up the putter itself. It is the putter which implements the physiological and psychological aspects of hitting a golf ball.

A more detailed explanation of the physiological, psychological and putter factors associated with hitting a golf ball appear in the paragraphs which follow.

PHYSIOLOGY OF THE GOLFER'S BODY

Skeletal and Muscular Structure—The skeletal size of a golfer's body (height, length of arms, width of shoulders, etc.) impacts the shape of a golfer's putting stroke. Each golfer's putting stroke is as unique and personal as his/her finger print. Similarly, the size and strength of a golfer's muscles can have a major impact on the geometry of a golfer's putting stroke.

Eye-Hand Coordination—The ability of a golfer to visually determine the location of the hole with respect to the location of the golf ball and then to properly move his/her arms and hands to aim the stroke of a putter so that the golf ball moves across the green towards the hole is a function of the eye-hand coordination of each individual golfer. Four factors affect the visual component of eye-hand coordination: (a) far sightedness, (b) near sightedness, (c) left eye dominance and (d) right eye dominance. Each one of these four factors or a combination of distance and directional factors will have a significant effect on the golfer's visual perception of the location of the hole—specifically, where the golfer believes he/she should aim the golf ball.

While the hole itself never moves on the green, the factors which impact on the vision of a human being may actually cause the visual perception of the location of a hole to a golfer to be different than its actual location on the green. In other words, for most golfers, the hole is not exactly where the golfer's eyes perceive that it is located.

Sound—The golfer's hearing or the ability to perceive the sound made by the striking face portion of the putter's head hitting the golf ball contribute to the feedback a golfer gets from the putter. The sound of a putter's head hitting a golf ball together with the golfer's visual picture of the head of a putter striking the golf ball and the impact forces transmitted from the putter's head up the shaft to the golfer's hands provide the "feel" associated with a particular putter. In golf, as in any other sport, golfers seek to replicate the "feel" of a successful putting stroke from their putter each time they play.

PSYCHOLOGY OF THE GOLFER'S APPROACH TO PUTTING

The conscious approach of a golfer to the striking of a stationary golf ball to move it toward a hole on a golf course includes the golfer's many conscious thoughts such as: the assessment of the golf course's landscape which surrounds and the green, the read of the slope and length of the green, the golfer's personal adjustment of the position of the putter's head with respect to the golf ball, and the triggering of the right muscle memory to move the putter along the path necessary to make the golf ball travel along a selected target line from its position of rest toward the hole.

The subconscious approach of a golfer to the movement of a putter to properly strike a stationary golf ball includes the underlying ability to envision the golf ball traveling along the target line to the hole, the ability to position one's body and hands to adjust the position of the putter's striking face to aim the putt toward the hole, and the ability to adjust the force with which the golf ball is struck to achieve the desired travel distance. The effect of the subconscious mind on a golfer's putting stroke may even cause the golfer to adjust those changes made in the golfer's conscious approach to striking a stationary golf ball. For example, some professional golfers have learned that successful putts are made by aiming for either the right edge or left edge of the hole. After a while, aiming to one edge of a hole or the other no longer becomes a conscious choice; rather it becomes part of the subconscious approach a professional golfer uses to line up a putt.

THE PUTTER ITSELF

The specifications describing a putter include (from top to bottom):

1. Grip type and size
2. Shaft length
3. Hosel length
4. Club head:
    a. Size and design
    b. Material
    c. Lie angle
    d. Loft angle
    e. Offset
    f. Balance The specifications of a putter are particularly important as many golf teaching professionals believe that individual golfers can dramatically improve their golf score if the golfer's putter is custom made to fit the size, the structure, and the strength of the golfer's body. Because each person's golf swing and physical capabilities are unique, custom made putters can maximize the effectiveness and efficiency of each golfer's unique putting stroke and physical capabilities. In general terms, maximizing the performance of an individual golfer can be obtained, in part, by adjusting the length of the putter's shaft and further by adjusting the spatial and geometric inter-relationships between the ball-striking surface on the putter's head with respect to the putter's shaft. For many years, golf club manufacturers made putters having only a predetermined shaft length, lie angle, and ball-striking face loft angle. It was then up to the individual golfer to make subtle conscious and subconscious changes to his/her putting stroke to use these prior art putters to properly direct the golf ball toward the hole.

Despite the many years that the game of golf has been played, many golf club manufacturers have not thoroughly understood the complex spatial and geometric inter-relationships between the striking face portion of the putter's head and the putter's shaft. The next few paragraphs will lay the foundation for an understanding of these complex spacial and geometric inter-relationships. This understanding is necessary to more fully appreciate the laser aim determination system of the present invention which is used to provide those measurements needed to create a custom made putter.

The Parts of a Putter

1. Grip type and size. The grip on the top of the shaft which contacts the golfer's hands is typically a rubber, leather, cork or plastic cover designed to fit securely over the uppermost end of the putter's shaft. Most putter grips include a flat surface. Golfers use the flat surface on the grip to orient the placement of their hands on the grip. Most golfers prefer that the flat surface to be on the top of the putter's shaft so that the flat surface is oriented in a plane perpendicular to the striking face portion of the putter. A smaller number of golfers prefer an alternative placement of the flat surface. The diameter of a grip should be such that the golfer's fingers may comfortably wrap around that portion the grip to hold the putter securely while the golfer's body is properly positioned for a putting stroke. Thus, a golfer with small hands will use a smaller diameter grip and a golfer with large hands will use a large diameter grip.

2. Shaft length. The shaft is the second major portion of the putter. A putter's shaft is typically a hollow metal tube. The shaft may also be solid. For example, in recent years solid putter shafts have been made from graphite. It is the adjustment of the length of the shaft portion of a putter which is primarily used to fit the putter to the height of an individual golfer.

3. Hosel length. At the bottom of the putter's shaft is the hosel. The hosel connects the bottom of the putter's shaft to the putter's head. A particular design for a hosel is disclosed in U.S. Pat. No. 5,275,409 which is included herein by reference. The bottom of the putter shaft may either be received in the top of the hosel or the top of the hosel may be inserted into the hollow interior of the putter's shaft. Alternatively, an interconnecting insert piece may be inserted in the top of the hosel and also into the hollow portion of the club shaft. Some golfers prefer a short hosel, while others prefer a long hosel. The hosel length affects the golfer's visual perception of the putter's head when it is lined up against a stationary golf ball in preparation for a putting stroke.

4. Club head. At the lower end of the hosel is the putter's head. The putter's head includes a ball-striking face and a portion behind the ball-striking face to both support the ball-striking face and give weight to the putter's head. The angular orientation of the ball-striking face as it strikes a stationary golf ball determines the extent of vertical force imparted to the golf ball and thus the golf ball's lift off the green. The club head design of a putter may be a blade, a perimeter or heel-toe weighted club head, or a mallet style club head.

The material from which a putter's head is made imparts a certain "feel" to a putter as well as a distinctive sound on the impact of the ball-striking face with a stationary golf ball. As previously indicated, the feel of a putter is a significant part of the golfer's ability to properly hit the golf ball in a desired direction to the desired distance.

Further, the visual picture of the alignment of the putter's head with the golf ball is a significant contributing factor to the way a golfer positions the club head to aim his/her putt.

Having now generally described the parts of a putter, a still further understanding of the fitting method and portable golf club customizing system of the present invention may be had by describing the various spatial and geometric adjustments which can be made to a putter to suit the body size, the body structure and the eye-hand coordination of an individual golfer. Because of the importance of the complex inter-relationships of some of the foregoing parts of a putter, one to another, these interrelationships will be explained in greater detail in the following paragraphs.

SHAFT LENGTH OVER THE PUTTER HEAD

The most basic spatial relationship is the length of the putter's shaft over the putter's head. The length of the putter's shaft determines the position of the golfer's body when making a putting stroke. Proper positioning of a golfer's body is essential to making the golf ball travel the desired distance along the target line to the hole.

THE OFFSET OF THE BALL-STRIKING FACE PORTION OF THE PUTTER HEAD FROM THE LONG AXIS OF THE SHAFT

The striking face 104 is positioned perpendicular to the target line T toward the hole H, when the putt is to be made over a flat surface.

Figure 1A:
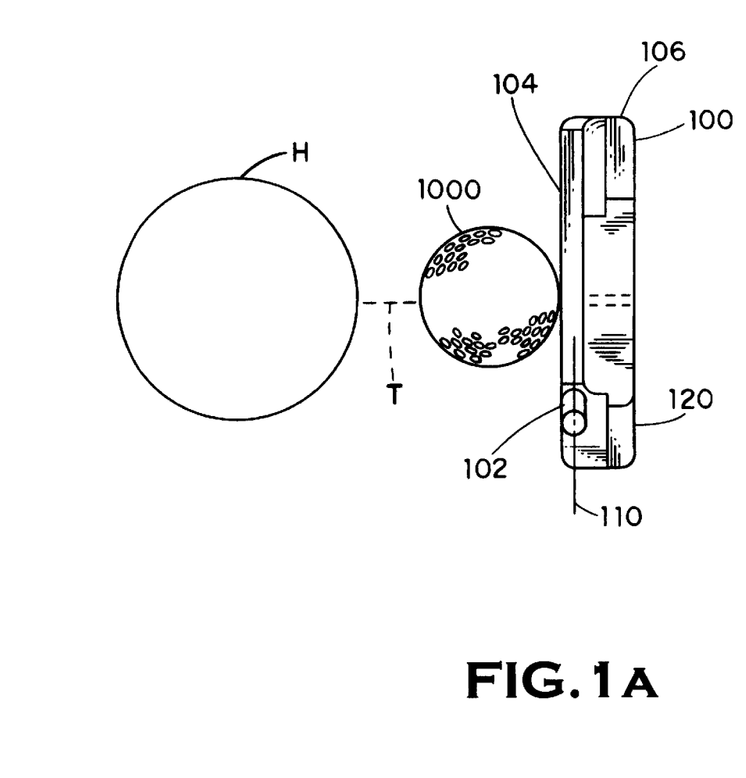
FIGS. 1A, 1B and 1C are top plan views of various putter head offset distances with respect to the center line of a putter's shaft.

The second spatial relationship between a putter's head and putter's shaft is offset distance. The offset distance is the distance between the plane of the ball-striking face portion of a putter's head and an extension of the long axis of the putter's shaft. Shown specifically, in FIG. 1A, is a putter 100 having no offset distance. Therein it will be seen that the front edge of the hosel 102 is effectively parallel with the striking face 104 of the putter's head 106.

Figure 1B:
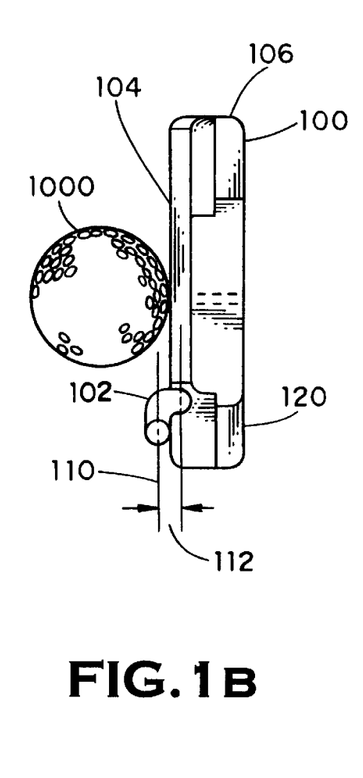

A slight offset 112 is shown in FIG. 1B. Therein it may be seen that an extension of the long axis 110 of the putter's shaft 118 is slightly ahead of the ball-striking face 104 of the putter's head 106. Further, in FIG. 1C, a even larger offset 114 is shown. The offset distance determines how the golfer aligns his visual picture of the golf ball 1000 with the striking face portion of the putter's head. This alignment has a significant effect on a golfer's swing or putting stroke.

Figure 1C:
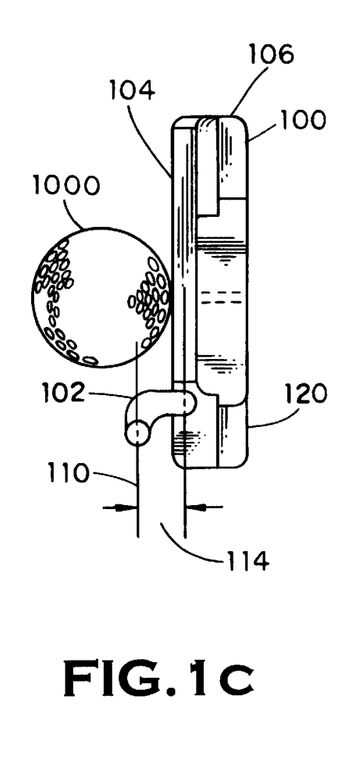

In addition to adjusting the visual picture of the putter's head 106 hitting the golf ball 1000, the size of the offset has a direct correlation to the size of the "sweet spot" on the striking face 104 of the putter's head 106. The "sweet spot" is the center of gravity of a putter's head in the toe-heel direction. As the offset distance increases, so does the size of the sweet spot. Thus, the larger the size of the sweet spot, the more stable the putter is when the ball contact point on the striking face portion of the putter's head 106 is away from the actual center of the sweet spot.

THE ANGLE BETWEEN THE SHAFT AND THE PUTTER HEAD (LIE ANGLE)

Figure 2A:
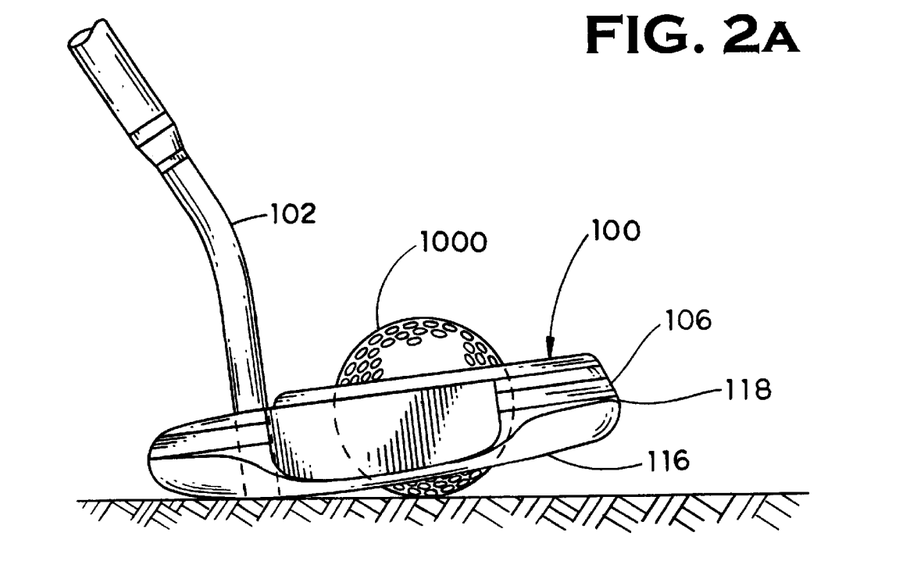
FIGS. 2A and 2B are rear elevational views of a putter showing its relationship to the ground with an improper lie angle bend.
Figure 2B:
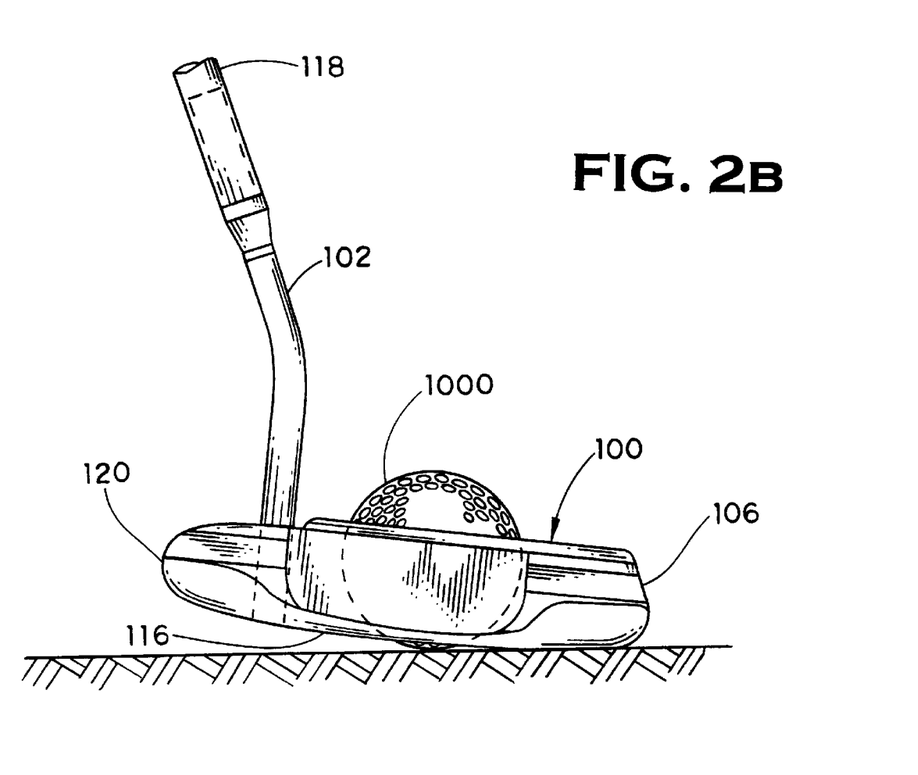

In FIGS. 2A and 2B, the effect of the lie angle is shown. Specifically, in FIG. 2A, a putter's head 106 is shown wherein the lie angle needs to be decreased or flattened in order for the bottom surface 116 or more specifically the toe 118 of the putter's head 106 to be closer to the ground. In FIG. 2B is shown the opposite condition. Therein the lie angle bend must be increased in order for the heel 120 of the putter's head to be closer to the ground. While the standard lie angle bend is approximately 72°, the proper lie angle for an individual golfer depends both on the distance that the golfer stands from the golf ball 1000, the golfer's body position, and the golfer's arm and hand position. This distance, body position and arm and hand position all affect the golfer's visual picture of the intersection of the putter's head 106 with the golf ball 1000 just as the offset distance affects the golfer's visual picture of the intersection of the putter's head 106 and the golf ball 1000.

THE ANGLE OF THE STRIKING FACE PORTION OF THE PUTTER HEAD OFF VERTICAL (LOFT ANGLE)

Figure 3A:
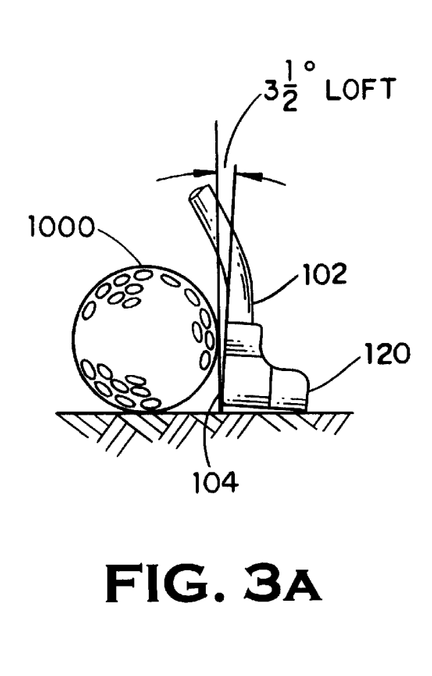
FIG. 3A is a side elevational view of a putter having the proper loft.
Figure 3B:
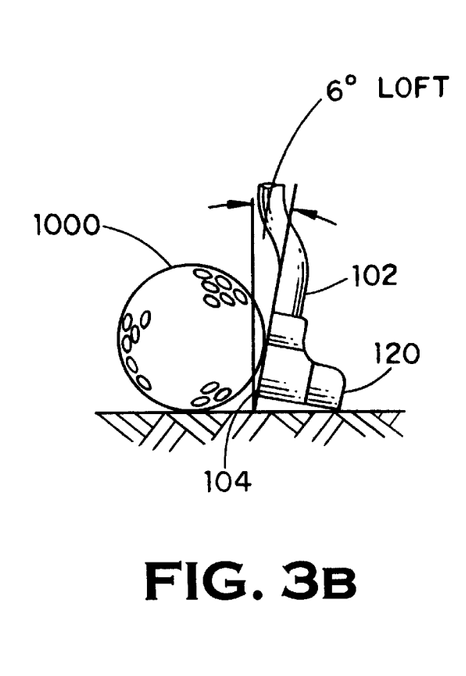
FIG. 3B is a side elevational view of a putter having too large a loft angle.
Figure 3C:
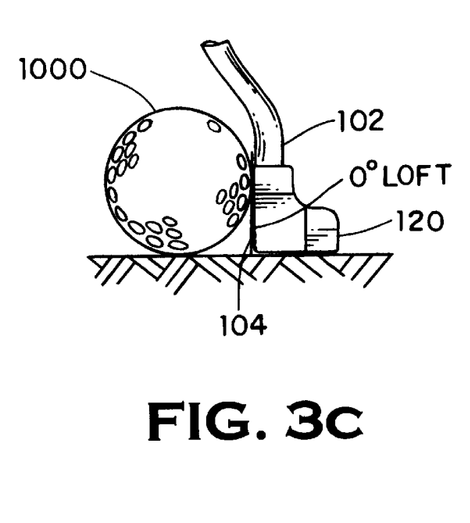
FIG. 3C is a side elevational view of a putter having too small a loft angle.

When the striking face 104 portion of a putter's club head 106 hits a golf ball 1000 it should both slightly lift the golf ball 1000 with a vertical force component and impart translational force to the golf ball 1000 with a horizontal force component to move the golf ball 1000 closer to the hole. In putters, the ideal lift angle or loft is 2° to 4°. When a stationary golf ball 1000 is struck by the striking face 104 portion of the putter's head 106 which is angled between 2° to 4°, enough vertical force is imparted to the golf ball 1000 to lift it from the grass yet enough translational force is imparted to the golf ball 1000 to cause it to roll across the green toward the hole. This ideal condition is shown in FIG. 3A. Unfortunately, the spatial relationship between the putter's shaft 118 and the putter's head 106 caused by the posture of a golfer can have a dramatic effect on the loft angle of on the ball-striking face 104 portion of a putter's head 106 as it contacts the ball 1000. In FIG. 3B is shown a situation where the spatial relationship between the putter's shaft 118 and the putter's head 106 is a result of a rear press by a golfer. A rear press causes the actual loft angle to increase to 6° or more when the golf ball is hit. In FIG. 3C the opposite condition is shown. By an improper spatial relationship between the putter's shaft 118 and the putter's head 106, as a result of a forward press of a golfer, the loft angle has been decreased to 0° or even to a negative angle when the ball-striking face contacts the stationary golf ball 1000.

THE BALANCE OF THE PUTTER HEAD OFF HORIZONTAL

If one were to place a finger at the point of balance on a putter shaft 118 so that the weight of the putter shaft 118 and grip on one side of the balance point were effectively equal to the weight of the club head 106 and shaft 118 on the other side of the balance point, the club head 106 would turn and seek its own angular balance orientation with respect to the long axis 110 the club shaft 118. For example, if the toe of the club head 106 drops down, this is called toe-heavy balance. If the toe of the club head rotates upward, this is called heel-heavy balance. If the face 104 of the club head 106 remains horizontal this is called face balance. The balance orientation of the club head 106 with respect to the long axis of the club shaft 118 is particularly important for a golfer that has a decelerating swing or putting stroke. For example, if the golfer's swing decelerates the club head 106 will tend to follow its heaviest part. A toe heavy balanced club head 106 will tend to follow the toe of the club head 106 and thereby change the angle at which the ball-striking face 104 of the club head 106 hits the stationary golf ball 1000. Similarly, a heel-heavy balanced club head 106 will tend to follow the heel of the club head and change the angle at which the ball-striking face 104 hits a stationary golf ball 1000.

THE INTER-RELATIONSHIP BETWEEN OFFSET DISTANCE AND PUTTER HEAD BALANCE

As previously indicated, a clear benefit of increasing the offset distance is its direct correlation to increasing the size of the sweet spot on the striking face portion 104 of the golf club head 106. This is best explained by using an example of a faced balance putter with a no offset distance. If a golf ball is dropped on the sweet spot of a putter supported at the central balance point on the shaft so that the shaft is horizontal, then the shaft 118 will not tend to rotate. But, if one drops the golf ball so that it impacts the ball-striking face portion of the putter's head away from the sweet spot, the force of the impact on the putter's head 106 will cause the shaft 118 to rotate. If one bounces a golf ball on the striking face 104 portion of a putter's head 106 with a greater offset distance, the tendency of the shaft to rotate will be reduced because of the larger sweet spot. That is, more distance is required from the sweet spot to cause the putter's head 106 to turn and the shaft 118 to twist on a putter having a larger offset distance. A golfer who has trouble hitting the golf ball on the sweet spot may improve his or her game by increasing the offset distance between the axis 110 of the putter's shaft 118 and the striking face 104 of the putter's head 106.

EXISTING CUSTOM PUTTERS

Unfortunately, in most commonly available prior art putters, it is usually impossible to precisely adjust the complex spatial and geometric relationships of the putters head 106 with respect to the putter's shaft 118. Thus the golfer using these prior art putter's must learn to modify the position of his/her body and his/her grip to adapt to the putter.

Some golfers elect to have their putters specially made to suit their swing or putting stroke and style of play. Quite often these golfers are looking for a certain feel rather than for a correction in the spatial and geometric relationships of the putter's head to the putter's shaft to correct for their personal physiology, particularly, their eye-hand coordination. However, when these prior art, specially made, putters are first provided to the golfer the need often arises to make special adjustments or "fine tune" the putter to give the custom made putter a better feel which many golfers believe is the key to maximum performance. Accordingly, the specially made putter must be returned to the factory for adjustment or entirely remade. If the adjustments are incorrect or the adjustments affect other parts of the complex inter-relationships of the spatial and geometric aspects of putter design, the custom made putter may once again have to be returned to the factory to suit the tastes of the individual golfer.

None of the prior art customizing systems have attempted to adjust the spatial relationship of the striking face of the putter's head to the long axis of the putter's shaft to correct for any problems in the golfer's personal physiology, particularly eye-hand coordination. Nor have any prior art customizing systems sought to provide a portable system where a custom made putter suited to an individual golfer's physiology can be fabricated right on the golf course.

THE NEED IN THE ART

In U.S. Pat. No. 5,275,409, an improved hosel system is disclosed for use in golf clubs. This improved hosel system for making a custom club allowed the angular relationship of the putter's head to the putter's shaft to be easily and accurately adjusted. While this hosel system dramatically improved the feel of the putter in the golfer's hands when hitting a golf ball, it was also found that the disclosed hosel could be bent to customize the spatial and geometric relationship of the putter's head with respect to the putter's shaft. The need remained, however, to provide a system for accurately determining the directional aiming tendencies of an individual golfer to properly bend the hosel to enable manufacture a custom made putter suited to the physiology of an individual golfer.

SUMMARY OF INVENTION

The present invention provides a system for measuring the directional aiming tendencies of an individual golfer off the target line. It includes a body portion having an end surface suitable to lay flat against the ball striking surface of a putter's head. At the opposite end of the body portion from the end surface is a pointer portion. Mounted to the under side of the body portion is a laser light assembly.

The laser aim determination system for use in creating a custom made putter is used by placing the flat end surface against the ball striking face of a putter's head when the golfer aims or line-ups a putt. The laser light assembly may then be used to accurately determine if the golfer's aim is to the left or to the right of a target line drawn between the position of the golf ball and the hole or a simulated hole. The measured directional aiming tendencies of an individual golfer are then used to custom make a putter suitable for use by an individual golfer. The aim deviation correction in a custom made putter is included in a bend in the hosel between the putter's shaft and the putter's head.

BRIEF DESCRIPTION OF THE FIGURES

A better understanding of the laser aim determination system for use in creating a custom made putter of the present invention may be had by reference to the figures wherein.

DESCRIPTION OF EMBODIMENTS

It has been found from hundreds of custom fittings of putters that the actual aim of the ballstriking face portion of a putter's head by the overwhelming majority of golfers is not such that a golf ball will move directly along the target line or the straight imaginary line drawn between the golf ball and the hole. This inability to accurately position the ball-striking face of a putter to make contact with a stationary golf ball to cause the golf ball to travel along the target line is due, in part, to the visual component of a golfer's eye-hand coordination. The visual component of a golfer's eye-hand coordination results from a combination of far/near sightedness and left/right eye domination. Thus, while the golfer's hands will properly respond to what the golfer's eyes see, this response will be improper because the golfer's eyes are not seeing the hole in its true position on the golf course. As a result, the individual golfer either: (a) consistently misses putts to the right or to the left according to their individual vision, or (b) develops a compensating movement or in their putting stroke which actually directs the golf ball toward the actual target—which is away from the target perceived by the golfer's eyes.

Consistently missing putts to the right or to the left is the most common problem of infrequent golfers. Unfortunately, infrequent golfers do not get enough playing time to see the development of a consistent miss pattern. Those who play golf on a more regular schedule either consciously misaim the golf ball or subconsciously adjust their putting stroke to correct for their visual misperception of the true location of the hole on a golf course. Even in putts as short as 10 feet, the effect of far/near sightedness and left/right eye dominance becomes readily apparent.

In general, a left eye aiming golfer perceives the hole closer left of its true location on the green. The spatial and geometric adjustment of the alignment of the putter's head to the putter's shaft to correct for this vision characteristic is greater offset distance and greater loft angle. By increasing the offset distance and the loft angle of the ball-striking face portion of a putter's head, the golfer perceives that the ball-striking face of the portion of the putter face is closed or aimed in a direction between the target line and the golfer. The golfer's subconscious will make the appropriate correction and aim the striking face portion of the putter's head on the target line. The degree of directional alignment correction is determined by the size of the offset distance and the loft angle added to the striking face portion of the club head.

In general, a right aiming golfer perceives the hole longer right of its actual location. The correction for this vision characteristic can be achieved by the reducing both the offset distance and the loft angle. By reducing both the offset distance (and in extreme cases creating onset) and the loft angle of the ball-striking face portion of the putter's head, it creates the optical illusion for the golfer that the putter face is open or aiming away from the target line. The golfer's subconscious mind will make the appropriate corrections and aim the putter on to the target line. The degree of the correction is determined by the degree of the reduction of offset distance and loft angle.

Putter Fitting Method

The laser aim determination system of the present invention is described according to its use for custom fitting a putter to an individual golfer.

Observation of the Individual Golfer's Position, Aim and Stroke

Observe the individual golfer make several putts with his/her putter or a putter with standard specifications. The following specific putting stroke characteristics are to be specifically noted.

A. Aim—using the laser aim determination system of the present invention described below, determine where the individual golfer is directionally (left or right) aiming the golf ball with respect to the target line. In most cases, an imaginary straight line drawn perpendicular to the ball-striking face of the putter's head as positioned by an individual golfer will fall either to the left or to the right of the true target line to the hole, even if the golfer is only 10 feet away from the hole. This directional deviation away from the target line is caused by the natural tendency of human beings to be either left eye or right eye dominant.

B. Stroke—observe the shape of the stroke and the travel path of the putter's head with respect to the target line between the hole and the golf ball. One of three basic strokes paths will be observed because of the natural tendency of human beings to move the club head portion of a putter along a large arcuate path.

1. Beginning at a position outside an extension of the target line behind the golf ball and ending at a position inside the target line in front of the golf ball.
 2. Beginning at a position behind the golf ball inside the target line and ending at a position outside the target line in front of the golf ball.

3. Beginning at a position inside the target line behind the golf ball coming to a position which is square with the golf ball at the point of impact and ending at a position inside the target line.

C. Ball Position—Observe the distance of the golf ball with respect to the individual golfer's toe line while the golfer is setting up for the putt.

Once a custom made club has been made to accommodate the observations and measurements of the individual golfer, the custom made, club may be further "fine tuned" according to the following two steps.

D. Observe the golfer make several putts with the newly made custom putter. Once again, use the laser sighting device (described below) to determine the accuracy of the golfer's aim. Only small fine tuning adjustments should be necessary to place the golfer's aim squarely on the target line.

E. Observe the path of the golfer's putting stroke. Adjust the distance between the toe line of the golfer's front foot and the golf ball so that the putting stroke begins inside the target line, meets the golf ball perpendicular to the target line and ends inside the target line.

Laser Aim Determination System

Figure 4A:
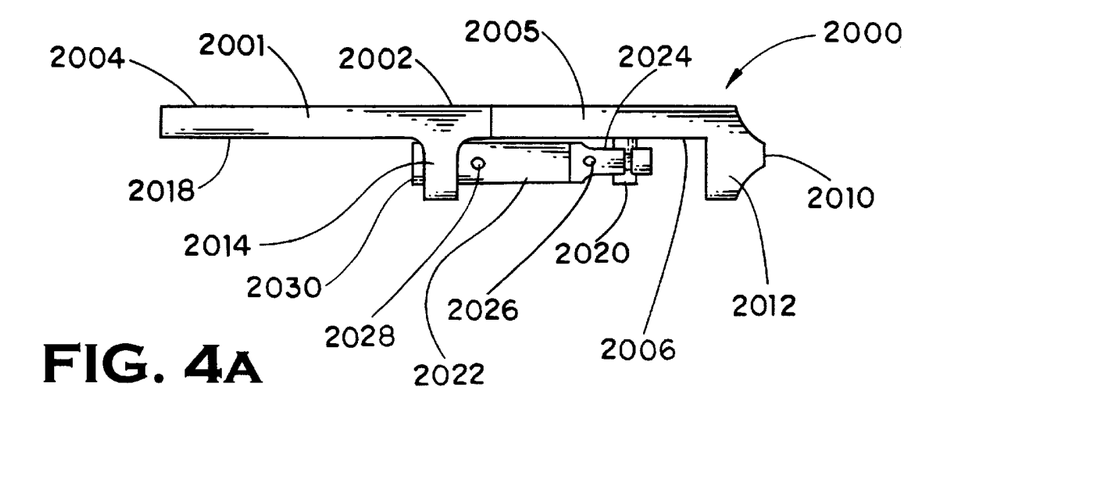
FIG. 4A is a left side elevational view of the laser aiming device.
Figure 4B:
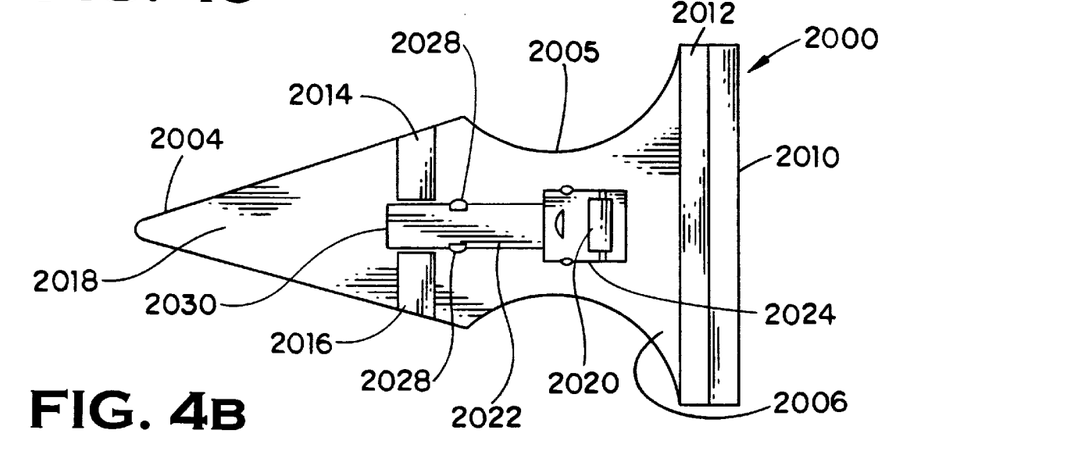
FIG. 4B is a bottom plan view of the laser aiming device.
Figure 4C:
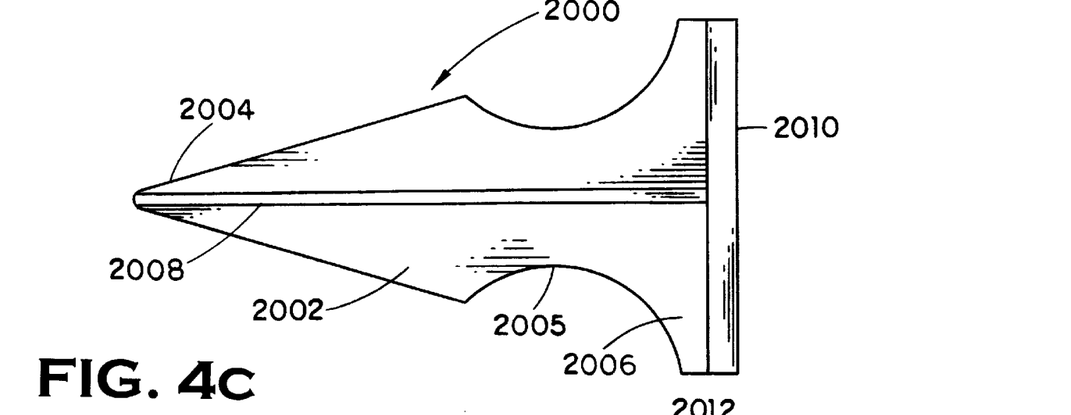
FIG. 4C is a top plan view of the laster aiming device.

The laser sighting device 2000 depicted in FIGS. 4A, 4B, and 4C provides a precise method of determining an individual's putter aim by projecting a laser light beam perpendicular to the ball-striking face portion of the putter's head. A perfectly aimed putter would cause the laser light beam to fall squarely on the target line or the imaginary line between the golf ball and the hole.

The laser sighting device 2000 of the present invention includes two parts.

The first part is a precisely milled body 2001 which can be placed flush against the ball-striking face portion of a putter head. The second part is a laser light assembly 2002 which projects a laser beam perpendicular to the ball-striking face portion of the putter head. The laser light assembly 2002 is calibrated for alignment with respect to the milled body 2001 using both horizontal and vertical adjustment screws 2028.

The laser sighting device 2000 has a pointed end 2004 and a straight end 2006. Connecting the pointed end 2004 to the straight end 2006 is a body portion 2001 which has a top surface 2002 and a bottom surface 2018. Formed near the straight end 2006 of the body portion 2001 are two optional cutouts 2005 for ease of handling of the laser sighting device 2000. Along the top surface 2002 is a score mark 2008 which runs from the pointed end 2004 to the straight end 2006. Perpendicular to the top surface 2002 of the laser sighting device 2000, at the straight end 2006, is a ball-striking face mating surface 2010 which is constructed and arranged to be perpendicular to the score mark 2008 which is on the top surface 2002 of the laser sighting device. Supporting the body portion 2001 is a rear leg 2012 and two middle legs 2014, 2016. The three legs 2012, 2014, 2016 provide a space between the bottom surface 2018 of the laser sighting device 2000 and the surface upon which the laser sighting device 2000 rests. In this space, a laser light assembly 2022 is mounted. The laser light assembly 2022 is attached to the bottom of the laser sighting device 2000 by engagement of a laser mounting bracket 2024 at the rear of the laser light assembly 2022 with a laser mounting block 2020. The laser light assembly 2022 features an on/off switch 2026 and adjustments 2028 for aiming the laser beam as it passes through aperture 2030 at the end of the laser light assembly 2022 directed toward the pointed end 2004 of the laser sighting device 2000.

Once the laser sighting device 2000 has been placed against the ball striking surface of the putter's head, the laser assembly 2022 is turned on by engagement of the on/off switch 2026. The laser light beam passing through the aperture 2030 will follow a path parallel to the score mark 2008 on the top surface 2002 of the laser sighting device 2000 and provide an indication to the golfer where a line projected perpendicularly from the ball-striking face portion of the club head will lie relative to a target such as a hole or a simulated hole. By using the laser sighting device 2000, the golfer or teaching professional will be able to determine how much the ability of the golfer to aim a golf ball along the target line is affected by the golfer's right eye or left eye dominance.

The following steps are used to determine the accuracy of a golfer's aim using the laser sighting device 2000.

Step 1—Choose a relatively flat surface on a putting green or, if inside, on a carpet. Place a background target just behind a hole or a simulated hole.

Step 2—At a distance of approximately 10–15 feet away from the hole or simulated hole, instruct the individual golfer to position his/her putter to direct a putt toward the hole or simulated hole.

Step 3—Once the ball-striking face of the putter is aligned to the golfer's satisfaction, secure the putter in place by stabilizing the putter's head to prevent movement of the putter's head and replace the golf ball with the laser sighting device. Square the laser sighting device to the ball-striking face of the putter by placing its back edge flush against the ball-striking face of the putter.

Step 4—Turn the laser light on to obtain an indication of the individual golfer's aim. To obtain a precise assessment of an individual golfer's aim, check the golfer's aim three to four times without having the individual golfer view the results. This prevents the individual golfer from making subconscious directional aim compensating adjustments.

Accordingly, the present invention provides easy to use system by which the directional aim tendencies may be determined for use in creating a custom made putter may be determined and a custom made putter may be manufactured and "fine tuned" to the special needs of an individual golfer.

While the system of the present invention has been described according to its preferred and alternate embodiments, those of ordinary skill in the art will realize that other embodiments of the method and system of the of the present invention have now been enabled. Such other embodiments shall fall within the scope of the appended claims.

What is claimed is:

1. A method for determining the optical imperception of the aim of a golfer with a putter, said method comprising steps of:
   a. causing the golfer to position the striking face of the putter head in a plane perceived by the golfer to be perpendicular to a target line between the hole and the golf ball;
   b. placing a flat surface of a laser mounting system against the striking face of said putter head so that said laser mounting system is not supported by said putter head;
   c. projecting a laser beam along a line perpendicular to said flat surface of said laser mounting system;
   d. measuring the distance between the laser beam and the center of the hole.

2. A method for checking the aim of a custom made putter, said method comprising the steps of:
   a. causing a golfer to position the striking face of the custom made putter head in a plane perceived by the golfer to be perpendicular to a target line between the hole and the golf ball;

b. placing a flat surface of a laser mounting system against the striking face of said custom made putter head so that said laser mounting system is not supported by said putter head;

c. projecting a laser beam along a line perpendicular to said flat surface of said laser mounting system;

d. measuring the distance between the laser beam and the center of the hole.

* * * * *